United States Patent [19]

Argumedo et al.

[11] 4,420,782

[45] Dec. 13, 1983

[54] THERMAL COMPENSATION FOR MAGNETIC HEAD ASSEMBLY

[75] Inventors: Armando J. Argumedo; William W. Chow, both of Tucson, Ariz.; Robert D. Freeman, Roy; Stawomir P. Kleczkowski, Ogden, both of Utah

[73] Assignee: International Business Machines, Armonk, N.Y.

[21] Appl. No.: 278,956

[22] Filed: Jun. 30, 1981

[51] Int. Cl.³ .............................................. G11B 5/10
[52] U.S. Cl. .................................. 360/129; 360/130.3
[58] Field of Search ............................. 360/129, 130.3

[56] References Cited

U.S. PATENT DOCUMENTS

| | | | |
|---|---|---|---|
| 2,769,036 | 10/1956 | Selsreb | 360/129 |
| 3,311,711 | 3/1967 | Maryatt | 360/129 |
| 3,548,393 | 12/1970 | Montel | 360/129 |
| 3,767,209 | 10/1973 | Seehawer | 274/4 R |
| 4,163,996 | 8/1979 | Kaseta et al. | 360/97 |

OTHER PUBLICATIONS

IBM Tech. Discl. Bulletin, vol. 22, No. 5, Oct. 1979, p. 2087.

Primary Examiner—Vincent P. Canney
Attorney, Agent, or Firm—N. N. Kallman; Otto Schmid, Jr.

[57] ABSTRACT

Ferrite read and write modules of a magnetic head assembly that are aligned and positioned within a non-ferrite housing are clamped by a leaf spring between the walls of the housing. The leaf spring compensates for thermal mismatch between the ferrite modules and the housing, and compensates for stress fluctuation that occurs with temperature change. The clamping force of the leaf spring is precisely controlled.

9 Claims, 5 Drawing Figures

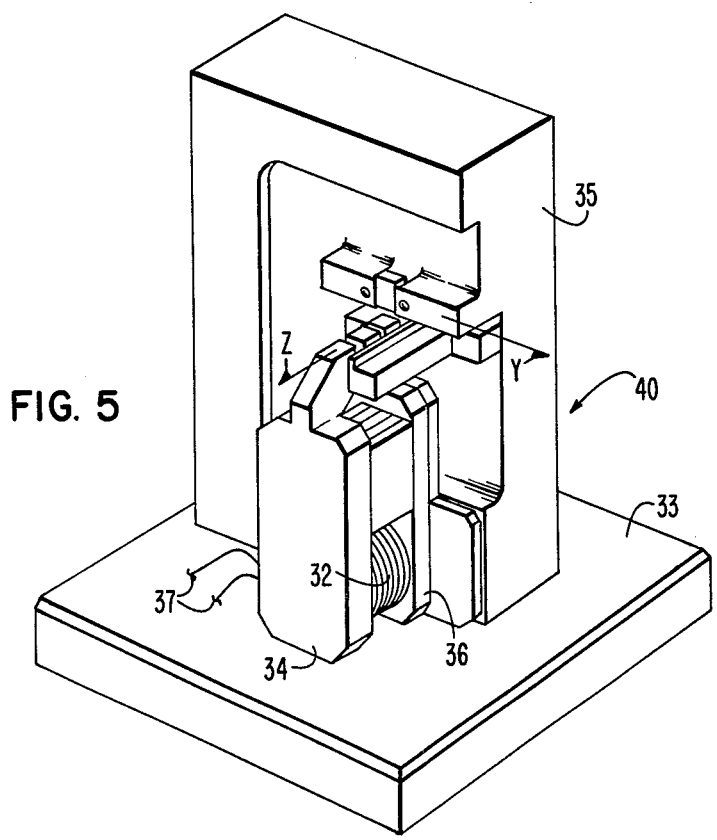
FIG. 5
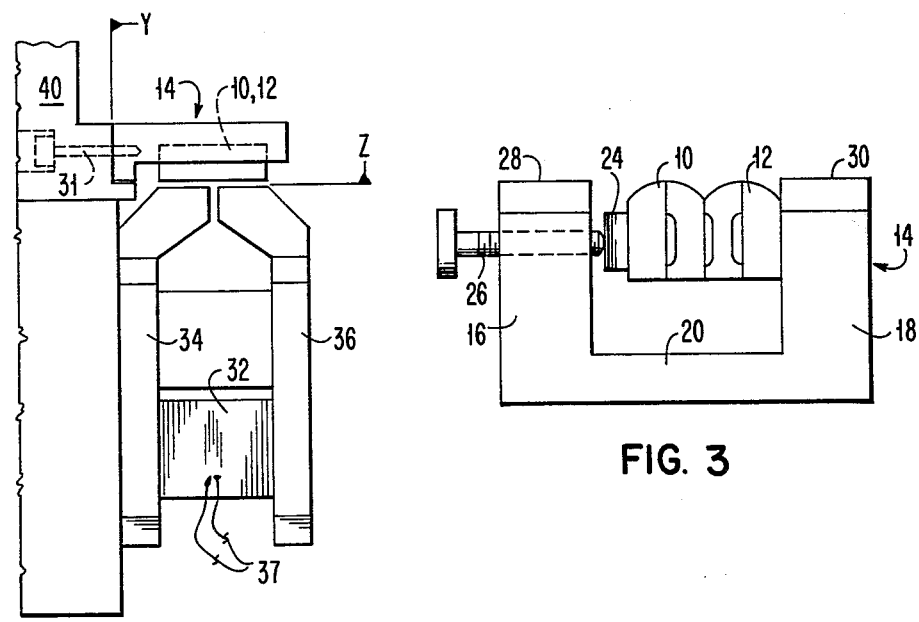
FIG. 4
FIG. 3

THERMAL COMPENSATION FOR MAGNETIC HEAD ASSEMBLY

TECHNICAL FIELD

This invention relates to a ferrite magnetic head assembly, and in particular to means for providing thermal compensation to a magnetic head assembly.

An object of this invention is to provide a ferrite magnetic head assembly wherein thermal mismatch problems are minimized.

Another object of this invention is to provide a ferrite magnetic head assembly wherein precise positioning of magnetic head modules is achieved by simple clamping design.

BACKGROUND ART

Some type of magnetic heads employ separate read and write modules in which ferrite is used as the pole pieces or substrate. The ferrite modules are mounted within a housing, which may be made of aluminum or another nonmagnetic material. A significant problem that is experienced with such head assemblies is that as a result of the differences of the coefficients of thermal expansion of the ferrite modules and housing materials, changes in ambient temperature cause dimensional fluctuations with resultant misalignment of the magnetic head parts, including the read and write transducing gaps. If the read and write modules comprise multi-track heads having a multiplicity of aligned transducing gaps, the problem is more critical.

One of the solutions that has been offered includes the matching of the ferrite material with the materials of the housing, so that the values of the thermal coefficients of expansion are similar or close. An optimum material for this purpose is titanium for use in a housing wherein ferrite modules are employed. However, titanium is very difficult to machine and relatively expensive. Other solutions that have been offered to solve this problem are complex and costly, and are not totally effective, especially for those multi-track heads that are made relatively small and have closely spaced transducing gaps.

BRIEF DESCRIPTION OF THE DRAWING

The invention will be described in detail with reference to the drawing in which:

FIG. 3 is a front elevational sectional view of the magnetic head assembly of FIG. 1;

FIG. 4 is a schematic view of an assembly tool used for assembling the magnetic head; and FIG. 5 is a representational isometric sectional view of the assembly tool illustrated in FIG. 4.

Similar numerals refer to similar elements throughout the drawing.

DESCRIPTION OF PREFERRED EMBODIMENT

Figure 1:
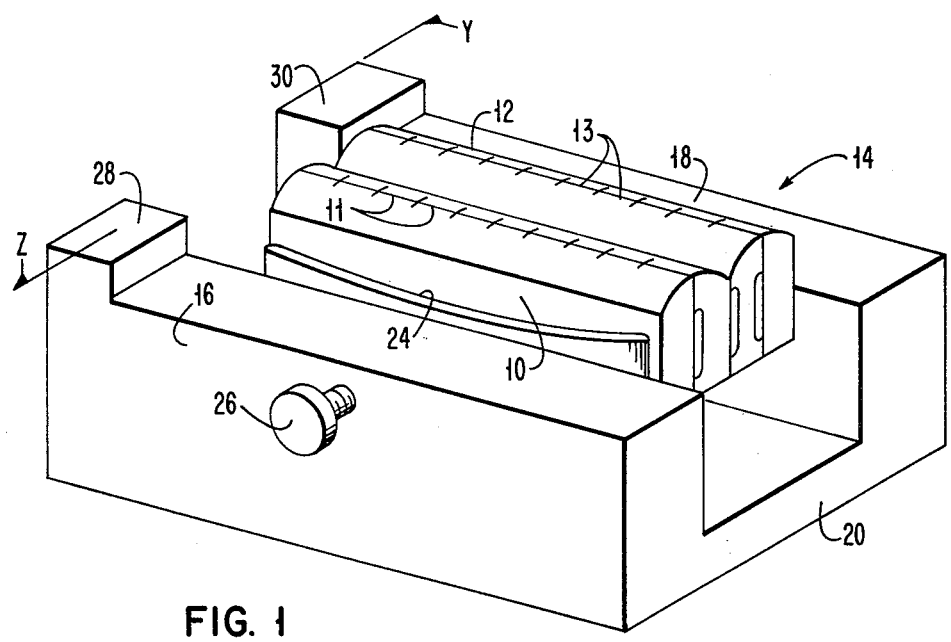
FIG. 1 is an isometric top front view of a magnetic head assembly, made in accordance with this invention.
Figure 2:
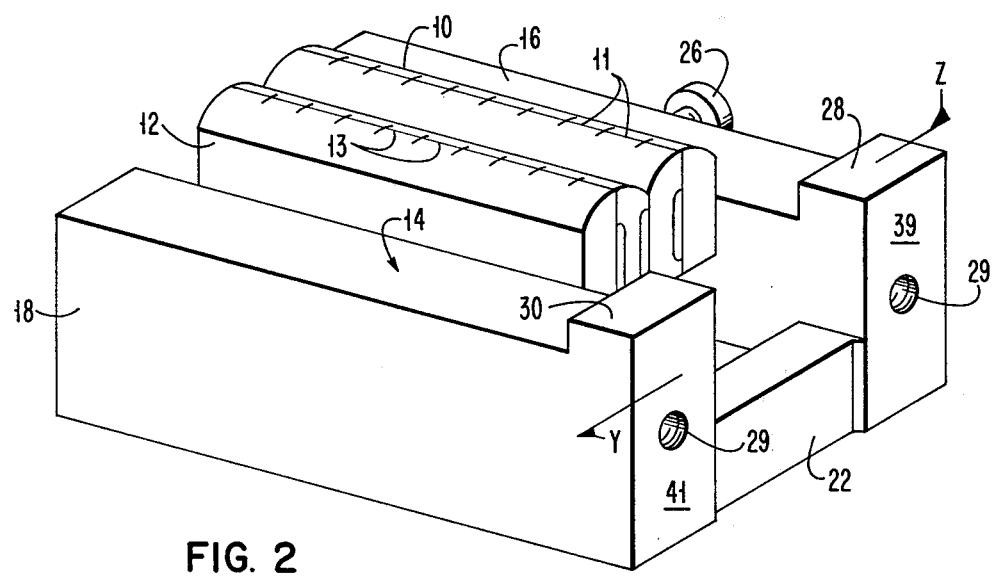
FIG. 2 is an isometric top rear view of the magnetic head assembly of FIG. 1.

With reference to FIGS. 1-3, a magnetic head assembly includes a ferrite write module 10 and ferrite read module 12 that are positioned within a one piece housing 14, which is made of aluminum for example. Each module has a multiplicity of discrete transducing gaps 11 and 13 disposed in alignment along a face of the module. The housing is formed with two opposing walls 16 and 18, with connecting portions 20 and 22. The read module 12 is fixed within a channel formed between the walls 16 and 18, against the inner surface of wall 18. The write module 10 is urged against the read module 12 in abutting relation by a curvilinear nonmagnetic leaf spring 24, preferably made of beryllium copper, that is located between the write module and the inner surface of the opposing wall 16. The tension of the leaf spring 24 may be varied by an adjustable screw 26 that is movable within a threaded aperture through the wall 16. The screw 26 bears on the center of the convex surface of the leaf spring 24 which may be spaced less than 0.1 inch from the inner surface of the adjacent wall 16.

The nonmagnetic leaf spring 24 provides a thermal compensating element between the aluminum housing 14 and the ferrite modules to compensate for the thermal mismatch between the ferrite and aluminum and the resultant stress fluctuation. A precisely controlled clamping force, of about 20 lbs., by way of example, is provided by the leaf spring and single adjusting screw. By use of the novel design, the variation of clamping force over a large range of temperature is minimal. By means of this simple and inexpensive arrangement, a precise alignment of the ferrite modules relative to the aluminum housing is maintained over a large temperature range. The configuration disclosed herein allows materials with different thermal expansion characteristics to be used in highly constrained configurations without the problems experienced as a result of thermal mismatch.

To implement the assembly of the read and write modules clamped by the leaf spring in an aligned fixed position, assembly tool 40 (FIGS. 4 and 5) is employed. The assembly tool sits on a stationary base 33 and has a vertical supporting structure 35. The tool incorporates an electromagnet having a coil 32 positioned between magnetic posts 34 and 36.

The head assembly is mounted by means of mounting screw holes 29 (FIG. 2) and two holding screws 31 (FIG. 5) to the assembly tool 40 so that the head housing pads 28 and 30 rest on datum surface Z and the end surfaces 39 and 41 of the head assembly are seated to the Y datum of the tool 40. In this mounted position, the Z datum is tangent to the apex of the read module 12.

During assembly, the write and read ferrite modules 10 and 12 are lowered into the aluminum housing 14, the modules are positioned side-by-side against the wall 18 of the housing, and the current from a power supply 37 to the coil 32 is turned on. As a result, the modules are urged against the inner surface of the housing wall 18 and against each other and are held in position by the magnetic force of the electromagnet. The modules are effectively aligned relative to the cooperating datums Y and Z formed in the housing 14 and in the magnetic tool 40.

With the read module 12 being held in rigid position against the housing wall 18, and the write module being held fixedly in alignment against the read module by means of the applied magnetic force, the leaf spring 24 is inserted in the small open space between the opposing housing wall 16 and the write module. The shape of the convex surface of the leaf spring is controlled by means of the adjustable screew 26 and the force of clamping is adjusted to a predetermined value.

The screw 26 bears against the leaf spring and varies the curvilinear geometry of the spring to exert more or less force against the write module, as desired. In the preferred embodiment, a force of about 20 pounds is applied as the clamping force to maintain the head modules in fixed position within the housing.

By virtue of this invention, effective compensation for thermal mismatch is realized so that precise alignment of read and write gaps of associated multitrack read and write elements remain accurately aligned. A relatively high constant clamping pressure, which is adjustable, is applied in a simple and inexpensive manner to maintain the read and write modules in fixed position.

What is claimed is:

1. A magnetic head assembly comprising:
   an integral one piece housing two opposing walls, made of nonmagnetic material;
   head module means formed of a magnetic material positioned within said housing;
   said magnetic and nonmagnetic materials having different coefficients of thermal expansion;
   nonmagnetic leaf spring means disposed between one wall of said housing and said head module means for clamping said module means to an opposing wall of said housing and for providing thermal compensation to said module means; and
   adjusting means to provide adjustment of the clamping force of said leaf spring means to a predetermined value.

2. A magnetic head assembly as in claim 1, wherein said nonmagnetic material is aluminum and said magnetic material is ferrite.

3. A magnetic head assembly as in claim 1, wherein said head module means comprises separate read and write ferrite modules positioned adjacent to each other.

4. A magnetic head assembly as in claim 3, where each of said ferrite modules includes a multiplicity of transducing gaps disposed in a collinear array.

5. A magnetic head assembly as in claim 1, wherein said spring means is formed from beryllium copper.

6. A magnetic head assembly as in claim 1, wherein said adjusting means comprises screw means for providing adjustment of the clamping force of said spring means.

7. A magnetic head assembly as in claim 1, wherein said head module means is positioned within said housing without adhesive or epoxy.

8. A magnetic head assembly as in claim 1, wherein said housing is formed with a channel wherein said head module is seated.

9. A magnetic head assembly as in claim 1, including datum pads formed with said housing for enabling accurate assembly of said head module means within said housing.

* * * * *

UNITED STATES PATENT AND TRADEMARK OFFICE
CERTIFICATE OF CORRECTION

PATENT NO. : 4,420,782
DATED : December 13, 1983
INVENTOR(S) : A. J. Argumedo, W. W. Chow, R. D. Freeman and S. P. Kleczkowski It is certified that error appears in the above—identified patent and that said Letters Patent is hereby corrected as shown below:

Column 3, Claim 1, line 2, after "housing" insert --having--.

Signed and Sealed this

Twenty-fourth Day of April 1984

[SEAL]

Attest:

GERALD J. MOSSINGHOFF

Attesting Officer

Commissioner of Patents and Trademarks